United States Patent
Viola et al.

(10) Patent No.: US 12,440,391 B2
(45) Date of Patent: *Oct. 14, 2025

(54) DEVICE AND METHOD FOR APPLYING ABSORBING INSERTS IN A PLANT AND PROCESS FOR THE PRODUCTION OF PULL-UP DIAPERS

(71) Applicant: M.D. VIOLA MACCHINE S.R.L., Valle Salimbene (IT)

(72) Inventors: Davide Viola, Valle Salimbene (IT); Marco Viola, Valle Salimbene (IT); Andrea Viola, Valle Salimbene (IT)

(73) Assignee: M.D. VIOLA MACCHINE S.R.L., Valle Salimbene (IT)

( * ) Notice: Subject to any disclaimer, the term of this patent is extended or adjusted under 35 U.S.C. 154(b) by 311 days.

This patent is subject to a terminal disclaimer.

(21) Appl. No.: 18/033,888

(22) PCT Filed: Nov. 17, 2021

(86) PCT No.: PCT/IB2021/060640
§ 371 (c)(1),
(2) Date: Apr. 26, 2023

(87) PCT Pub. No.: WO2022/112901
PCT Pub. Date: Jun. 2, 2022

(65) Prior Publication Data
US 2023/0398024 A1    Dec. 14, 2023

(30) Foreign Application Priority Data
Nov. 30, 2020    (IT) ......................... 102020000029120

(51) Int. Cl.
*A61F 13/15*    (2006.01)
(52) U.S. Cl.
CPC .. *A61F 13/15601* (2013.01); *A61F 13/15699* (2013.01); *A61F 13/15804* (2013.01)

(58) Field of Classification Search
CPC ......... A61F 13/15593; A61F 13/15699; B32B 38/1875; B32B 2250/03; B32B 2250/40
See application file for complete search history.

(56) References Cited

U.S. PATENT DOCUMENTS

| 8,440,043 B1 | 5/2013 | Schneider et al. |
| 2022/0009742 A1 | 1/2022 | Viola et al. |

FOREIGN PATENT DOCUMENTS

| EP | 2 886 089 A1 | 6/2015 |
| IT | 201800011037 A1 | 6/2020 |
| WO | 2020/121094 A1 | 6/2020 |

OTHER PUBLICATIONS

Mar. 9, 2022 International Search Report issued in International Patent Application No. PCT/IB2021/060640.

(Continued)

*Primary Examiner* — Carson Gross
(74) *Attorney, Agent, or Firm* — Oliff PLC (57) ABSTRACT

A method for applying absorbing inserts in a process for the production of pull-up diapers, includes: feeding a composite elastic web, including at least one elastic element, along a path and according to an advancing direction, conferring said composite elastic web with an application tension such that the composite elastic web has an elongation lower than a nominal maximum elongation thereof and the elastic element has a second percentage elastic elongation lower than first percentage elastic elongation corresponding to the nominal maximum elongation; applying absorbing inserts on an intermediate portion of the composite elastic web while the composite elastic web advances with said application tension, such that, once the tension is completely released, the absorbing inserts remain substantially flat and do not form substantial folds or wrinkles.

15 Claims, 4 Drawing Sheets

(56) References Cited

OTHER PUBLICATIONS

Mar. 9, 2022 Written Opinion issued in International Patent Application No. PCT/IB2021/060640.

FIG.7

DEVICE AND METHOD FOR APPLYING ABSORBING INSERTS IN A PLANT AND PROCESS FOR THE PRODUCTION OF PULL-UP DIAPERS

FIELD OF THE INVENTION

The object of the present invention is a device and a method for applying absorbing inserts in a plant and in a process for the production of pull-up diapers. Another object of the present invention is a plant and a process for the production of said pull-up diapers and a diaper thus obtained.

The present invention is situated in the field of production of pull-up diapers, whose packaging is executed starting from various semifinished products, including webs of material wound in reels, such as for example polyethylene, fabric, nonwoven fabric (TNT), cellulose wadding (tissue).

By pull-up diapers it is intended, in the present description and in the enclosed claims, diapers for children and for adults made in closed pull-up underwear style and also underwear and panties with appearance more similar to normal underwear and panties but provided with absorbing insert.

STATE OF THE ART

Diapers for children and adults made in closed pull-up underwear style are already known and present on the market. Such diapers are generally composed of an absorbing insert placed internally and by an external elasticized chassis that forms the pull-up. The absorbing insert has the function of absorbing the liquids and containing the solid parts. The elasticized chassis substantially has the shape of an underwear garment and has the function of supporting and adhering the absorbing insert to the body, with the object of rendering it as adherent and comfortable as possible once put on.

The manufacturing of the pull-up diapers occurs automatically and continuously in only one production line. In such line, webs of materials are unwound from the reels in order to be subsequently fed to processing stations which provide for coupling them to each other and possible to other materials, in order to form a semifinished product constituted by a composite web.

The absorbing insert is usually formed by a lower impermeable layer, an upper permeable layer and by a ground cellulose pulp mixed with absorbent powder and placed between the lower and upper impermeable layers.

The elasticized chassis is usually formed by two non-fabrics, upper and lower, and by elastic threads glued-welded in between the two non-fabrics. The two non-fabrics in the form of webs are unwound from reels and fed, maintaining them at a constant tension and the elastic threads are fixed between the two non-fabrics while they are elongated with a specific elongation, which can arrive even up to 400% of the initial length, in order to obtain an elastic web. On such matter, for example, the documents IT201800011037 and WO2020/121094A1, in the name of the same Applicant, illustrate a method for feeding elastic threads in a process for the production of layered composite articles, in which the elastic threads are fed along a path extended from one reel and up to a joining zone with two web materials, where a pair of opposite transport surfaces are configured in order to receive between them and in order to join the web materials with the elastic threads unwound from the reel.

Such elongation/tension is maintained also during the subsequent coupling with the absorbing inserts, which is not illustrated in the documents IT201800011037 and WO2020/121094A1. The composite and elastic web thus obtained is subsequently shaped, to obtain a series of open diapers, provided with the absorbing inserts and joined to each other. The composite web is then folded longitudinally in two and welded at welding zones interposed between one diaper and the next, so as to obtain a series of closed diapers that are joined together. The abovementioned composite web is thus cut at the welding zones, so as to obtain the individual diapers. These operations are carried out while the composite web advances with continuity along a feeding path in a plant for the production of the abovementioned diapers.

When the pull-up diapers are separated and each single diaper is expelled from the plant and is no longer maintained under tension, the elastic threads tend to be contracted, i.e. they tend to return to their natural length (to the length that they have if they are not placed under tension). The contraction of the elastic threads causes the contraction of the entire diaper also in the zone of the absorbing insert. Such contraction in the zone of the absorbing insert generates folds in the absorbing insert itself and such folds can negatively affect the comfort for the person who wears the diaper and also the functionality of said diaper.

In order to overcome this problem, it is known to deactivate the elastic threads in the zone of the absorbing insert. For example, provision is made for cutting, with multiple micro-cuts, the entire zone to be deactivated, such that only that zone of the chassis, which corresponds to the absorbing insert, is without elastics under tension. For example, the public document U.S. Pat. No. 8,440,043 illustrates a method and an apparatus for deactivating elastics in a continuous elastic laminate comprising said elastics glued between a first and a second continuous substrate. The method provides for moving the elastic laminate between a cutting roller and a counter-roller, wherein the cutting roller comprises a flexible blade which is bent when it comes into contact with the elastic laminate supported by the counter-roller and then elastically returns to a non-deformed configuration thereof. When the blade bends, it exerts a pressure on the elastic laminate and cuts the elastics.

Object of the Invention

The Applicant has observed that the deactivation of the elastic threads operated according to the known methods is not technically easy to obtain in the correct manner. Indeed, the cutting of the elastic threads, if the cutting devices are not well-calibrated, might not be correctly executed, leaving several threads intact, or it can lead to the breakage of the entire diaper.

The Applicant has observed that, if also the deactivation is correctly executed, the diaper produced has micro-cuts in the surface fabrics and such micro-cuts, which in addition to being anti-aesthetic can still compromise the integrity of the diaper.

In addition, the need to make micro-cuts does not allow using all the types of fabric or nonwoven fabric that one would like and/or it limits the freedom to make the chassis in the desired materials and with the desired structures.

In such context, the Applicant has therefore set the objective of proposing a device and a method for applying absorbing inserts in a plant and in a process for the production of pull-up diapers and also a plant and a process for the production of pull-up diapers which first of all allow making pull-up diapers of higher quality, having higher aesthetic and qualitative value than those pre-existing.

In such context, the Applicant has in particular set the objective of proposing a device and a method for applying absorbing inserts which allow preventing the annoying wrinkles of the absorbing inserts themselves and simultaneously maintaining the integrity of the entire diaper.

The Applicant has in particular set the objective of proposing a device and a method which allow preventing the wrinkles of the absorbing inserts without having to deactivate, i.e. cut, the elastic threads.

Definitions

"nominal maximum elongation of the composite elastic web": elongation beyond which the composite elastic web breaks or is damaged or is plastically deformed; "nominal width of a pull-up diaper": maximum width obtained by laterally pulling a finished diaper so as to completely extend it; the nominal maximum elongation of the composite elastic web corresponds to the nominal width of the diapers; "percentage elastic elongation of the elastic element": percentage elastic elongation with respect to a rest length of said elastic element.

SUMMARY OF THE INVENTION

The Applicant has found that such objectives and further objects can be obtained by means of a method, a device, a process and a plant in accordance with the present invention, of the type claimed in the enclosed claims and/or described in the following aspects.

In particular, the Applicant has found that such objectives and further objects can be obtained by applying each absorbing insert to the composite and elastic web while such elastic web continues to advance along the respective path with a tension such to subject it to elongation lower than a nominal maximum elongation thereof.

For example, the tension, to which the composite elastic web is subjected along a first part of its path along the production line, is reduced before applying the absorbing inserts and preferably maintained reduced for the subsequent part of the path.

Otherwise, the composite elastic web is unwound from a reel by pulling it, in order to confer the correct tension thereto and the correct elongation thereto, i.e. lower than the nominal maximum elongation thereof.

In particular, in accordance with a first aspect, the present invention relates to a method for applying absorbing inserts in a process and/or in a plant for the production of pull-up diapers, comprising:
  producing a composite elastic web comprising at least one web of material and at least one elastic element longitudinally coupled to said at least one web of material; wherein the composite elastic web has a nominal maximum elongation corresponding to a nominal width of the pull-up diapers to be manufactured; wherein, when the composite elastic web is at the nominal maximum elongation thereof, said at least one web of material is fully extended and said at least one elastic element has a first percentage elastic elongation;
  feeding the composite elastic web along a path and according to an advancing direction, conferring to said composite elastic web an application tension such that the composite elastic web has an elongation lower than the nominal maximum elongation thereof and said at least one elastic element has a second percentage elastic elongation lower than the first percentage elastic elongation;
  applying absorbing inserts on an intermediate portion of the composite elastic web while the composite elastic web advances with said application tension, such that, once the tension is completely released, the absorbing inserts remain substantially flat and do not form substantial folds or wrinkles.

Optionally, the method comprises:
  feeding said at least one composite elastic web along a path and according to an advancing direction; wherein the composite elastic web is fed by conferring to said elastic web a first tension and conferring to at least one element of said composite elastic web a first percentage elastic elongation along a first section of said path; conferring to said composite elastic web a second tension or application tension and conferring to said at least one element of said elastic web a second percentage elastic elongation along a second section of said path placed downstream of the first section, wherein the second percentage elastic elongation is lower than the first percentage elastic elongation;
  applying absorbing inserts on the intermediate portion of the elastic web when said elastic web moves along the second section, such that, once the tension is completely released, the absorbing inserts remain substantially flat and do not form substantial folds or wrinkles.

In accordance with a second aspect, the present invention relates to a process for the production of pull-up diapers, comprising the method of the first aspect and/or of one or more of the following aspects. Such process, while the composite elastic web advances along said path and according to the advancing direction, also comprises:
  cutting out in the composite elastic web, between successive absorbing inserts, openings for the legs, to define a series of precursors of pull-up diapers, wherein the intermediate portion of the composite elastic web corresponds to the crotch of the pull-up diapers, each provided with the absorbing insert, and two opposite longitudinal lateral portions of the composite elastic web correspond to the waist of the pull-up diapers and in which transverse separation zones separate one precursor from the next;
  longitudinally folding the composite elastic web so as to bring opposite sides of each transverse separation zone next to each other and join together said opposite sides;
  cutting the composite elastic web at the transverse separation zones to obtain the individual pull-up diapers.

In accordance with a third aspect, the present invention relates to a device for applying absorbing inserts in a plant for the production of pull-up diapers, wherein the device comprises:
  at least one motorized surface, optionally at least one pair of opposite motorized surfaces, configured to engage and advance a composite elastic web along a path and according to an advancing direction;
  wherein the composite elastic web comprises at least one web of material and at least one elastic element longitudinally coupled to said at least one web of material; wherein the composite elastic web has a nominal maximum elongation corresponding to a nominal width of the pull-up diapers to be manufactured; wherein, when the composite elastic web is at the nominal maximum elongation thereof, said at least one web of material is fully extended and said at least one elastic element has a first percentage elastic elongation;

an applicator operating downstream said at least one motorized surface and configured for applying, in succession on the composite elastic web, a plurality of absorbing inserts while the composite elastic web advances along the path and according to the advancing direction;

a control unit operatively connected to said at least one motorized surface and configured and/or programmed to adjust a linear speed of said at least one motorized surface so as to:

confer to the composite elastic web an application tension such that the composite elastic web has an elongation lower than the nominal maximum elongation thereof and said at least one elastic element has a second percentage elastic elongation lower than the first percentage elastic elongation when the composite elastic web is placed downstream said at least one motorized surface and at the applicator.

Optionally, the device comprises:

at least one first motorized surface, optionally at least one pair of first opposite motorized surfaces, configured to engage and advance the composite elastic web along the path and according to the advancing direction;

at least one second motorized surface, optionally at least one pair of second opposite motorized surfaces, configured to engage and advance said composite elastic web along the path and according to the advancing direction, wherein said at least one second motorized surface is placed downstream said at least one first motorized surface;

an applicator operating downstream of the at least one second motorized surface and configured for applying, in succession on the composite elastic web, the plurality of absorbing inserts while the composite elastic web advances along the path and according to the advancing direction;

wherein the control unit is operatively connected to said at least one first motorized surface and to said at least one second motorized surface and configured and/or programmed to adjust a linear speed of said at least one first motorized surface and/or of said at least one second motorized surface so as to:

confer to the composite elastic web a first tension and to at least one element of said composite elastic web a first percentage elastic elongation, when the composite elastic web is upstream of said at least one first motorized surface; and confer to the composite elastic web a second tension or application tension and to said at least one element of said elastic web a second percentage elastic elongation when the composite elastic web is downstream said at least one first motorized surface and at the applicator;

wherein the second percentage elastic elongation is lower than the first percentage elastic elongation.

In accordance with a fourth aspect, the present invention relates to plant for the production of pull-up diapers, comprising the device of the third aspect and/or of one or more of the following aspects.

Optionally, the plant comprises:

a leg-opening unit placed downstream of the applicator and configured for cutting in the composite elastic web, between successive absorbing inserts, openings for the legs and defining a series of precursors of pull-up diapers, wherein transverse separation zones separate one precursor from the next;

a folding device placed downstream of the leg-opening unit and configured for longitudinally folding the composite elastic web and bringing the opposite sides of each transverse separation zone next to each other;

a joining device placed downstream of the folding device and configured for joining together said opposite sides;

a cutting device placed downstream of the joining device and configured for cutting the composite elastic web at the transverse separation zones and obtaining the individual pull-up diapers.

In a fifth aspect, the present invention relates to a pull-up diaper obtained by means of the process and/or with the plant of the present invention.

The Applicant has verified that the solution according to the invention first of all allows improving the quality of the pull-up diapers produced and/or rendering them similar or identical to a normal underwear garment.

The Applicant has in particular verified that the solution according to the invention allows producing pull-up diapers with absorbing inserts that are substantially extended, i.e. they do not have annoying wrinkles/folds.

The Applicant has also verified that the solution according to the invention allows producing pull-up diapers with integral chassis, i.e. without micro-cuts.

The Applicant has also verified that the solution according to the invention allows using different types of fabrics or nonwoven fabrics and also of structures for the elastic chassis, since such materials do not have to be cut in order to produce the micro-cuts.

Further aspects of the invention are described hereinbelow.

In one aspect, the composite elastic web comprises a first web of material, a second web of material and said at least one elastic element arranged longitudinally between the first web of material and the second web of material.

In one aspect, said at least one element of said composite elastic web comprises the or is defined by the plurality of elastic threads.

In one aspect, said at least one elastic element of said composite elastic web comprises at least one elasticized fabric or nonwoven fabric, optionally a plurality of elasticized fabrics or nonwoven fabrics, optionally arranged layered.

In one aspect, the first percentage elastic elongation is substantially equal to the maximum elongation of said at least one elastic element before the elastic element is broken or in any case loses the full capacity of elastic return.

In one aspect, a ratio between the second percentage elastic elongation and the first percentage elastic elongation is lower than 0.99, optionally lower than 0.7.

In one aspect, a ratio between the second percentage elastic elongation and the first percentage elastic elongation is greater than 0.3, optionally greater than 0.5.

In one aspect, the first percentage elastic elongation is comprised between 200% and 600%, optionally between 300% and 500%, of a rest length.

In one aspect, the second percentage elastic elongation is comprised between 100% and 300%, optionally between 150% and 250%, of a rest length.

In one aspect, the first tension is comprised between 1 Kg and 5 Kg per meter of width of the web, optionally between 2 Kg and 4 Kg per meter of width.

In one aspect, the second tension or application tension is comprised between 0.2 Kg and 1 Kg per 100 mm of width of elastic front, i.e. of the elasticized part of the composite elastic web, optionally between 0.4 Kg and 0.8 Kg per 100 mm of width.

In one aspect, producing the composite elastic web comprises: feeding the first web of material and the second web of material along respective paths; feeding said at least one elastic element, optionally the plurality of elastic threads, along a respective path; inserting said at least one elastic element between the first web of material and the second web of material and joining said at least one elastic element to the first web of material and to the second web of material while the first web of material, the second web of material and said at least one elastic element advance along a common path, to form the composite elastic web.

In one aspect, said at least one elastic element, preferably the plurality of elastic threads, is/are joined to the first web of material and to the second web of material by means of hot glue or ultrasound welding.

In one aspect, the elastic threads are arranged only on part of the width or over the entire width of the first web of material and of the second web of material.

In one aspect, the first web of material and the second web of material are fed with a tension, optionally comprised between 1 Kg and 5 Kg per meter of width of the web, optionally between 2 Kg and 4 Kg per meter of width.

In one aspect, during the joining, said at least one elastic element, preferably the elastic threads, is/are conferred with the first percentage elastic elongation.

In one aspect, during the joining, the first web of material and the second web of material are fully extended.

In one aspect, during the joining to the first web of material and to the second web of material, the first tension is conferred.

In one aspect, downstream of the application of the absorbing inserts and up to before the cut in the individual pull-up diapers, the composite elastic web is maintained at the second tension or application tension.

In one aspect, the control unit is configured and/or programmed to confer an application linear speed to said at least one motorized surface.

In one aspect, the control unit is configured and/or programmed to confer the application linear speed to the first motorized surface.

In one aspect, the control unit is configured and/or programmed to confer a first linear speed to the first motorized surface and a second linear speed or application linear speed to the second motorized surface, wherein the second linear speed or application linear speed is lower than the first linear speed.

In one aspect, the device comprises a pair of motorized rollers defining said motorized surfaces.

In one aspect, the device comprises a first pair of motorized rollers defining said first motorized surfaces.

In one aspect, the device comprises a second pair of motorized rollers defining said second motorized surfaces.

In one aspect, the control unit is configured and/or programmed to advance the composite elastic web at the second linear speed or application speed into an application zone of the applicator and while the applicator applies the absorbing inserts on the elastic web.

In one aspect, the applicator comprises a transport surface configured to hold the absorbing inserts and transport them one after the other into an application zone.

In one aspect, in said application zone, the transport surface is facing and close to the composite elastic web so as to lay the absorbing insert against the composite elastic web and release the absorbing insert on the composite elastic web.

In one aspect, the control unit is operatively connected to the applicator and is configured and/or programmed to adjust a linear speed of the transport surface.

In one aspect, said linear speed of the transport surface is, at least in the application zone, substantially equal to the application speed of the elastic web.

In one aspect, the applicator comprises a rotatable wheel and the transport surface is a peripheral surface of said rotatable wheel.

In one aspect, the absorbing inserts are glued on the composite elastic web.

In one aspect, the applicator comprises a dispenser of hot glue, optionally of spray type, operatively active at the application zone or immediately upstream of the same, in order to dispense said hot glue on the composite elastic web and/or on the absorbing insert before applying said absorbing insert to said composite elastic web.

In one aspect, the rotatable wheel comprises suction devices operatively active on the peripheral surface in order to retain the absorbing inserts and in order to release them one at a time on the composite elastic web.

In one aspect, the plant comprises: devices for feeding a first web of material and a second web of material along respective paths; devices for feeding said at least one elastic element, preferably a plurality of elastic threads, along a respective path; a coupling device configured to insert said at least one elastic element, preferably the plurality of elastic threads, between the first web of material and the second web of material and join the plurality of elastic threads to the first web of material and to the second web of material.

In one aspect, the control unit is operatively connected to the devices for feeding the first web of material and the second web of material, to the devices for feeding said at least one elastic element, preferably the plurality of elastic threads, and to the coupling device and is configured and/or programmed to join the first web of material, the second web of material and said at least one elastic element, preferably the plurality of elastic threads, conferring to said at least one elastic element, preferably to the elastic threads, the first percentage elastic elongation and conferring to the first web of material and to the second web of material the first tension and/or while the first web of material and the second web of material are fully extended.

In one aspect, the coupling device comprises a pair of opposite coupling rollers, optionally motorized.

In one aspect, the control unit is configured and/or programmed for conferring to the pair of opposite coupling rollers of the coupling device a peripheral speed greater than the application linear speed of said at least one motorized surface.

In one aspect, the coupling device comprises a hot glue dispenser or an ultrasound welder operatively active at the pair of coupling rollers.

In one aspect, the composite elastic web is previously produced in a different place and/or with a different apparatus/device and then wound in a reel.

In one aspect, a reel holder is configured to carry, in a reel, the composite elastic web and provision is made for feeding the composite elastic web along said path and according to said advancing direction by unwinding from the reel holder.

In one aspect, said at least one motorized surface, optionally the first motorized surface and the second motorized surface, is/are placed downstream of the reel holder to engage and advance the composite elastic web unwound from the reel holder.

Further characteristics and advantages will be clearer from the detailed description of a preferred but not exclusive embodiment of a plant and a process for the production of pull-up diapers in accordance with the present invention.

BRIEF DESCRIPTION OF THE DRAWINGS

Such description will be set forth hereinbelow with reference to the enclosed drawings, provided only as a non-limiting example, in which:

FIGS. 3-6 illustrate a composite elastic web for making pull-up diapers in respective processing steps in the plant of FIG. 1;

DETAILED DESCRIPTION OF PREFERRED EMBODIMENTS OF THE INVENTION

With reference to the enclosed figures, reference number 1 overall indicates a manufacturing plant for the production of pull-up diapers 2. All the steps/operations described hereinbelow are executed in a continuous manner, without interruptions on a single production line of the plant 1 in accordance with the process according to the present invention.

In the plant 1, the packaging of the abovementioned pull-up diapers 2 is executed starting from different semi-finished products, including webs of material 3a, 3b wound in reels 4, such as for example polyethylene, nonwoven fabric, cellulose wadding (tissue), etc.

The webs of material 3a, 3b are continuously fed through the plant 1 along respective paths and are joined, shaped, conformed and cut, etc., in order to produce the abovementioned pull-up diapers 2.

Figure 1:
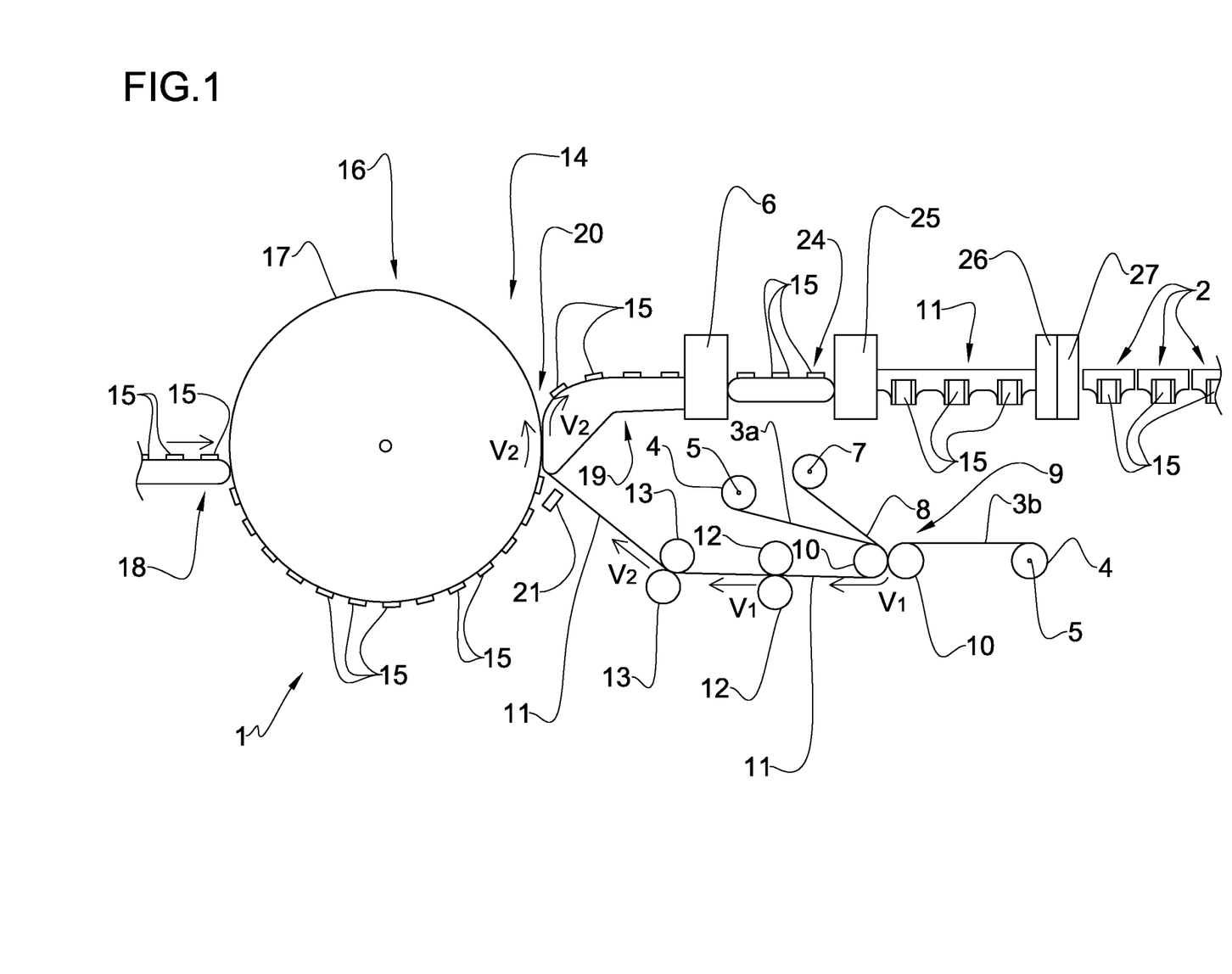
FIG. 1 shows a side elevation schematic view of a plant for the production of pull-up diapers according to the present invention.

In the schematic example illustrated in FIG. 1, the plant 1 comprises two reel holders 5 for the respective reels 4 of webs of material 3a, 3b and spools 7 for a plurality of elastic threads 8. A first web of material 3a and a second web of material 3b unwound from the respective reel holder 5 and the elastic threads 8 unwound from the spools 7 are fed along respective paths and directed towards a coupling device 9 defined by a pair of opposite and motorized coupling rollers 10.

The first web of material 3a and the second web of material 3b are for example nonwoven fabrics.

Figure 2:
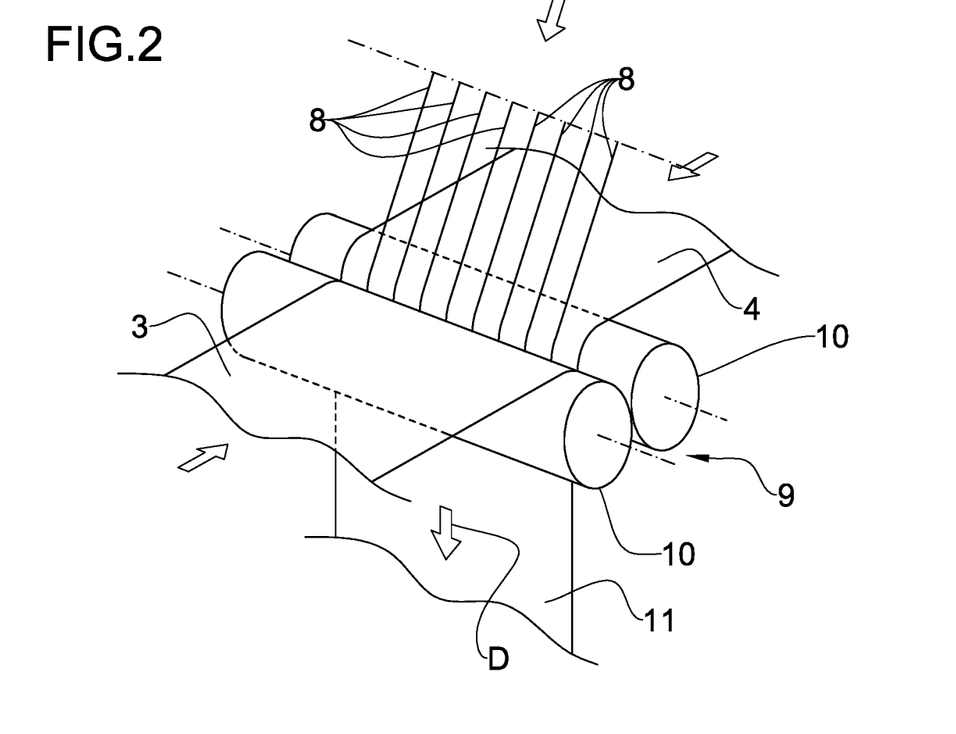
FIG. 2 illustrates a device of the plant of FIG. 1.

The coupling device 9 is configured to longitudinally insert the plurality of elastic threads 8 between the first web of material 3a and the second web of material 3b and join the plurality of elastic threads 8 to the first web of material 3a and to the second web of material 3b. As illustrated in FIG. 2, the first web of material 3a and the second web of material 3b pass between radially peripheral surfaces of the two coupling rollers 10 and the elastic threads 8 move between the two coupling rollers 10 and between the first web of material 3a and the second web of material 3b. In the illustrated embodiment, the elastic threads 8 are distributed over the entire width of the webs of material 3a, 3b in order to have an elasticized weave which is as uniform as possible.

Figure 7:
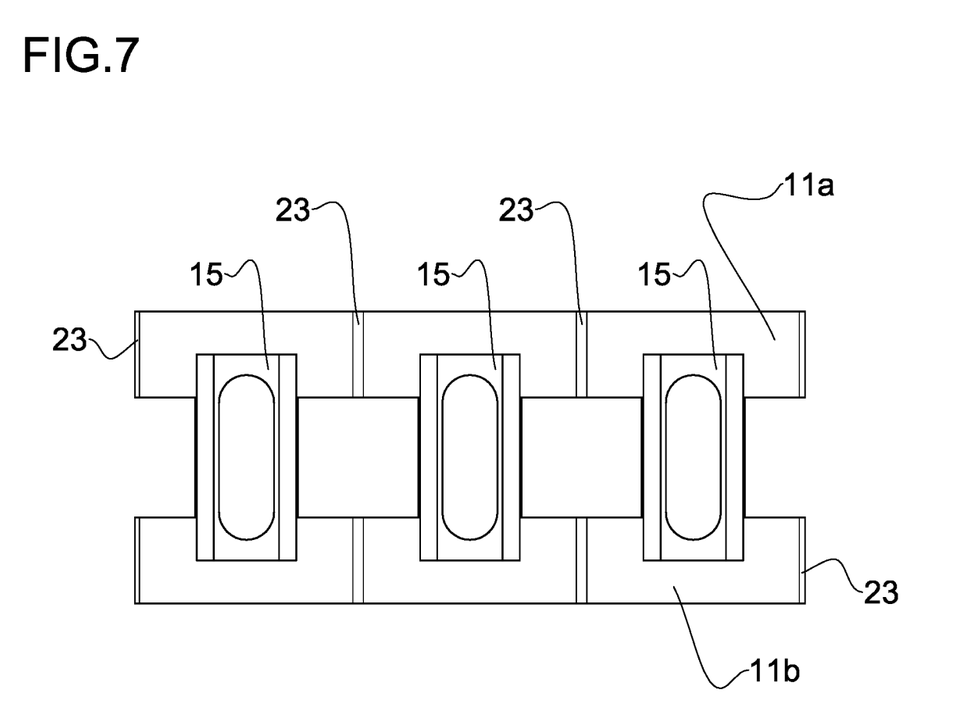
FIG. 7 illustrates a different embodiment of the composite elastic web according to the present invention.

In alternative embodiments, the elastic threads may be arranged only in the two external bands of two webs of material 3a, 3b in order to elasticize only the band around the waist. Otherwise, as illustrated in FIG. 7, the chassis can be formed with two separate and distinct elasticized lateral bands 11a, 11b such that the insert comes to be joined only in the front and rear part with the chassis formed by the two bands and the central part of the pull-up diaper is the insert itself.

Upstream of the two coupling rollers 10, there is a hot glue dispenser, not illustrated, which provides for spraying the elastic threads 8 with the glue before they pass between the two coupling rollers 10 and between the first web of material 3a and the second web of material 3b. The two coupling rollers 10 compress the first web of material 3a and the second web of material 3b on the elastic threads 8, causing the joining thereof. Alternatively, it is possible to use other instruments for coupling the threads to the webs, e.g. an ultrasound welder. The two coupling rollers 10 make the glue deposited on the elastic threads 8 adhere to the two webs of material 3a, 3b, rendering them integral but provided with different tensions.

A control unit, not illustrated, is operatively connected to devices for feeding the first web of material 3a and the second web of material 3b, to devices for feeding the plurality of elastic threads 8 and to the coupling device 9 and is configured and/or programmed to adjust feeding speeds of the first web of material 3a, of the second web of material 3b and of the plurality of elastic threads 8, conferring suitable elongations/tensions to the webs 3a, 3b and to the elastic threads 8.

For example, the first and the second web of material 3a, 3b are inserted between the two coupling rollers 10 for example with a tension of about 2.5 kg per meter of width of the respective web, such that the first and the second web of material 3a, 3b are completely extended. The first and the second web of material 3a, 3b in this step have an elongation that is substantially zero (possibly of several millimeters per linear meter). The elastic threads 8 are inserted between the two coupling rollers 10 and between the two webs of material 3a, 3b with a high percentage elastic elongation, usually equal to the maximum percentage elastic elongation (before breakage) of said elastic threads 8. For example a 380 dTex thread is elongated 400%. Threads with different dTex can be used (e.g. 540 or 840 dTex) which are elongated with different percentages.

The coupling device 9 therefore forms a composite elastic web 11 which comprises the first web of material 3a, the second web of material 3b and the plurality of elastic threads 8 arranged longitudinally between the first web of material 3a and the second web of material 3b. At the time of coupling with the two webs of material 3a, 3b, the tension of the elastic threads 8 remains that set, e.g. 400%. The value of the elongation of the two webs of material 3a, 3b during the coupling with the elastic threads 8 remains that original, i.e. substantially zero.

Downstream of the coupling device 9, the composite elastic web 11 is advanced along a path thereof and according to an advancing direction "D". The elastic threads 8 of the composite elastic web 11 would tend to contract and wrinkle the composite elastic web 11 up to making the elastic threads 8 return to their rest configuration, but due to the stretch rollers present in the plant 1, the tension can be adjusted, giving the composite elastic web 11 the possibility to be contracted or eliminating that possibility.

The plant 1 comprises a first pair of motorized rollers 12 defining first opposite motorized surfaces, configured to engage and advance the composite elastic web 11 along said path and according to the advancing direction "D". Downstream of the first pair of motorized rollers 12, a second pair of motorized rollers 13 is situated defining second opposite motorized surfaces, these too configured to engage and advance said composite elastic web 11 along the path and according to the advancing direction "D".

In addition, an applicator 14 operates downstream of the second pair of motorized rollers 13 and is configured for applying, in succession on the composite elastic web 11, a plurality of absorbing inserts 15 while the composite elastic web 11 advances along the path and according to the advancing direction "D". Each absorbing insert 15 comprises, for example, an impermeable layer, a permeable layer and ground cellulose pulp mixed with super-absorbent powder arranged between the impermeable layer and the permeable layer.

The applicator 14 comprises a rotatable wheel 16 provided with a peripheral surface that constitutes a transport surface 17 for the absorbing inserts 15. The rotatable wheel 16 for example comprises suction devices, not illustrated, and operatively active on the peripheral surface, in order to retain the absorbing inserts 15, transport them and release them one at a time on the composite elastic web 11.

On one side of the rotatable wheel 16 (on the left of FIG. 1), a conveyor 18 is situated which provides for feeding in succession the absorbing inserts 15, manufactured in dedicated section of the plant 1, up to the rotatable wheel 16 and to release them on the transport surface 17. On an opposite side of the rotatable wheel 16 (on the right of FIG. 1), a conveyor belt 19 is situated which has a movable surface facing and close to the transport surface 17 at an application zone 20 of the applicator 14.

The applicator 14 also comprises a dispenser 21 of hot glue, e.g. of spray type, which is operatively active at the application zone 20 or immediately upstream of the same, in order to dispense the hot glue on the composite elastic web 11 and/or on each absorbing insert 15 before the absorbing insert 15 is brought by the rotatable wheel 16 against the composite elastic web 11.

The control unit is operatively connected to the first pair of motorized rollers 12, to the second pair of motorized rollers 13, to the rotatable wheel 16 and to the conveyor belt 19 and is configured for controlling/adjusting the speeds of such components.

In particular, the control unit is configured and/or programmed for conferring to the first pair of motorized rollers 12 and to the two coupling rollers 10 linear peripheral speeds such to maintain the composite elastic web 11 while it moves from the coupling device 9 towards the first pair of motorized rollers 12 at the nominal maximum elongation thereof. In this first path section, the elastic threads 8 are maintained in the elongated condition with a first percentage elastic elongation $\Delta 1\%$ equal to the percentage elastic elongation mentioned above, on the order of 400%. The two webs of material 3a, 3b are maintained completely extended and the composite elastic web 11 overall is advanced, maintaining it at nominal maximum elongation thereof.

The control unit is configured and/or programmed for conferring to the second pair of motorized rollers 13 linear peripheral speeds such to confer to the composite elastic web 11, while it moves from the first pair of motorized rollers 12 towards the second pair of motorized rollers 13, a second tension or application tension "T2" lower than the first tension "T1" and such that the elastic threads 8 are allowed to contract.

In other words, one proceeds by making the composite elastic web 11 pass through the second pair of motorized rollers 13 which have a peripheral speed lower than the peripheral speed of the first pair of motorized rollers 12. In this manner, the elastic threads 8 under tension inside the composite elastic web 11, partly freed from the tension due to the front stretching, are retracted and provide for absorbing the speed difference between the first and the second pair of motorized rollers 12, 13, thus forming an elasticized composite material which from a more extended size (nominal maximum elongation) reaches a smaller size (lower elongation).

For example, the second tension or application tension is equal to 0.6 kg per 100 mm of width of elastic front, i.e. of the elasticized part of the composite elastic web 11. In this second path section, the elastic threads 8 take on a second percentage elastic elongation $\Delta 2\%$ lower than the first percentage elastic elongation $\Delta 1\%$. For such purpose, a first linear speed "V1" of the first pair of motorized rollers 12 will be greater than a second linear speed "V2" of the second pair of motorized rollers 13. For example, the second percentage elastic elongation $\Delta 2\%$ is about 240% and a ratio between the second percentage elastic elongation $\Delta 2\%$ and the first percentage elastic elongation $\Delta 1\%$ is equal to 0.6. In other words, the percentage elastic elongation is reduced by 40%. Also the first web of material 3a and the second web of material 3b are partially contracted, following the elastics 8. The two webs of material 3a, 3b are integral with the elastic threads 8 and do not oppose the contraction.

Figure 3:
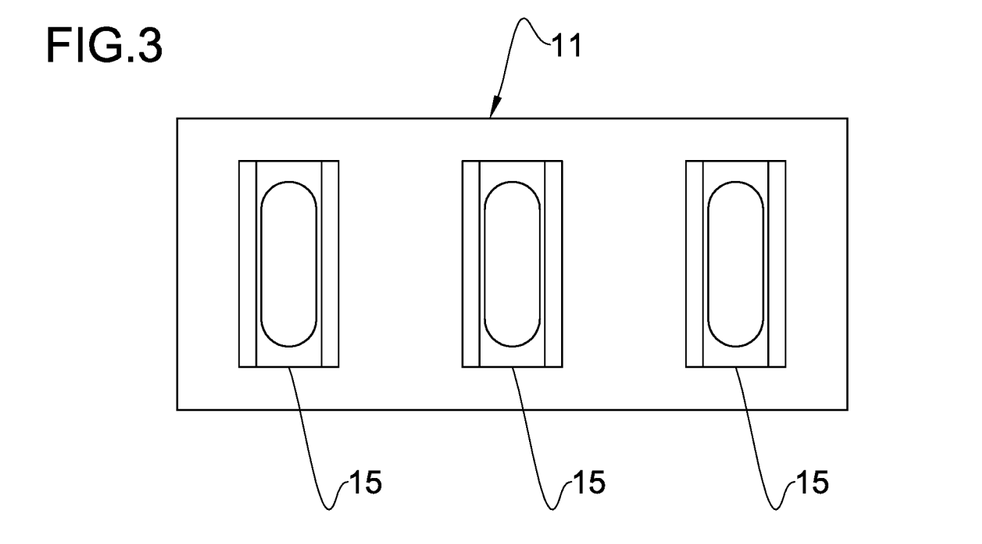

In accordance with the method of the present invention, the control unit is configured and/or programmed for conferring to the rotatable wheel 16 of the applicator 14 and to the conveyor belt 19 peripheral speeds such that the composite elastic web 11 is maintained under tension with said second tension or application tension "T2" and the elastic threads 8 are maintained elongated with the second percentage elastic elongation $\Delta 2\%$. In this manner, the absorbing inserts 15 are applied and glued on an intermediate portion of the composite elastic web 11 while the elastic threads 8 have a residual tension/elongation (i.e. the second percentage elastic elongation $\Delta 2\%$) lower than the percentage elastic elongation with which they are fed just unwound from the spools 7 and along the first section, i.e. upstream of the first pair of motorized rollers 12. The composite elastic web 11 provided with the absorbing inserts 15 which exits from the applicator 14 and is transported on the conveyor belt 19 downstream said applicator 14 is illustrated in FIG. 3.

An intermediate portion of the composite elastic web 11 corresponds to the crotch of the pull-up diapers 2, each provided with the absorbing insert 15, and two opposite longitudinal lateral portions of the composite elastic web 11 correspond to the waist of the pull-up diapers 2.

The plant 1 comprises a leg-opening unit 6 placed downstream of the applicator 14 and configured for cutting out in the composite elastic web 11, between successive absorbing inserts 15, openings 22 for the legs and defining a series of precursors of pull-up diapers 22. Each of the precursors of pull-up diapers 2 is connected to the preceding and to the successive by transverse separation zones 23 configured for being first joined and then cut.

Figure 4:
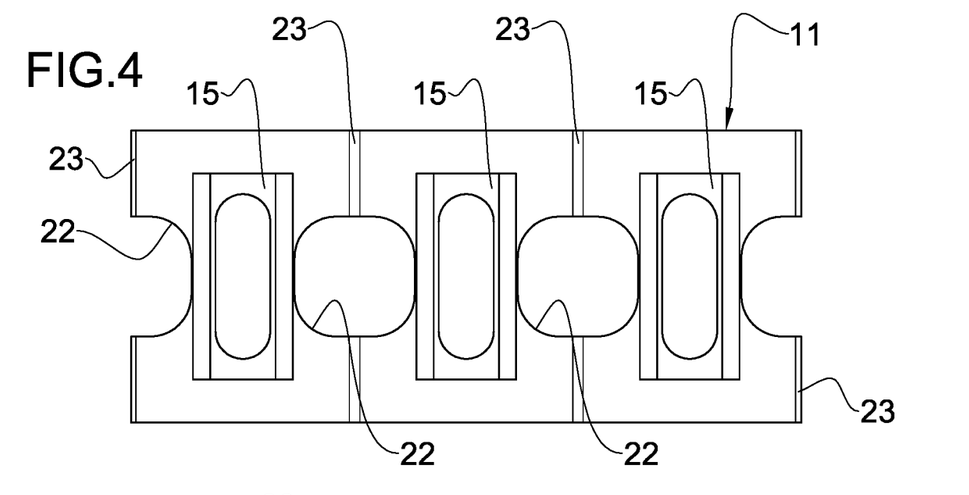

The leg-opening unit 6 is placed immediately downstream of the conveyor belt 19 in order to receive the composite elastic web 11 provided with the absorbing inserts 15, execute the leg-opening and feed the composite elastic web 11 on an auxiliary conveyor belt 24. The composite elastic web 11 that exits from the leg-opening unit 6 and is transported on the auxiliary conveyor belt 24 is illustrated in FIG. 4.

Figure 5:
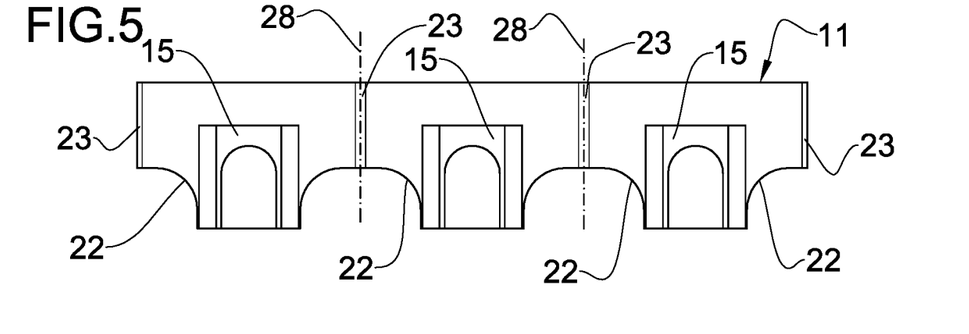

A folding device 25 is placed downstream of the leg-opening unit 6 and is configured for longitudinally folding the composite elastic web 11 and bringing opposite sides of each transverse separation zone 23 next to each other, for example as illustrated in FIG. 5 in which the composite elastic web 11 is longitudinally folded in two. The folding is executed while the composite elastic web 11 continues to advance along the path thereof.

Once folded, the composite elastic web 11 is transported up to a joining device 26 and to a cutting device 27 placed downstream of the folding device 25 and configured to join together the opposite sides of each transverse separation zone 23 and to cut the composite elastic web 11 at cutting lines 28 (FIG. 5) situated in the transverse separation zones 23 and obtain the individual pull-up diapers 2 (FIG. 7). Downstream of the application of the absorbing inserts 15 and up to before the cut in the individual pull-up diapers 2, the composite elastic web 11 is maintained at the second tension or application tension "T2".

Figure 6:
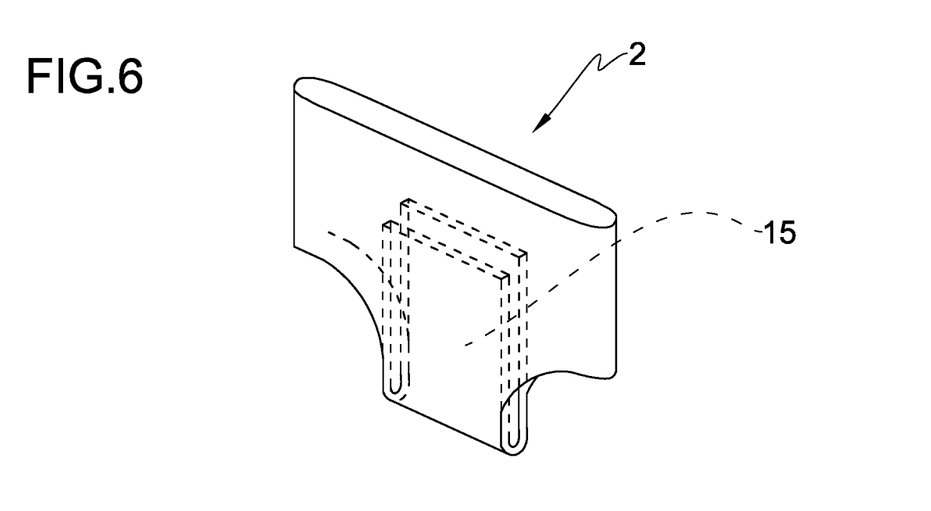
FIG. 6 illustrates a pull-up diaper attained according to the invention.

The transverse separation zones 23 are joined, for example by means of heat welding or ultrasound welding, so as to form bands, and then such bands are cut at the centerline cutting lines 28. When the cutting is executed, the tension of the conveyor belt 11 is completely released and each pull-up diaper 2 is contracted due to the contraction of the elastic threads 11 which tend to be brought to zero elongation. One of the pull-up diapers 2 obtained is illustrated in FIG. 6.

Since the absorbing insert 15 is applied to the composite elastic web 11 once the tension of the composite elastic web 11 is partly released and hence while the elastic threads 8 have a reduced percentage elastic elongation, the absorbing insert 15 of each single pull-up diaper 2, once the tension is completely released, remains substantially flat or does not form substantial folds or wrinkles or it forms weak undulations which do not result annoying and in any case are not such to compromise the functionality of the diaper 2 itself.

The assembly formed by the applicator 14, by the first pair of motorized rollers 12 and by the second pair of motorized rollers 13 defines the device for applying absorbing inserts according to the present invention which operates according to the method of the present invention.

In an embodiment variant, the control unit drives the first pair of motorized rollers 12 so as to reduce the tension of the composite elastic web 11 and the elongation of the elastic threads 8 up to the exit of the composite elastic web 11 from the coupling device 9. In such embodiment, the composite elastic web 11 is brought to an elongation smaller than the nominal maximum elongation thereof and the elastic threads 8 are brought to the second percentage elastic elongation Δ2% just after the coupling device 9. In such embodiment, the second pair of motorized rollers 13 does not have to be present.

In an embodiment variant, the first pair of motorized rollers 12 and the second pair of motorized rollers 13 sequentially operate successive reductions of the percentage elastic elongation of the elastic threads 8, e.g. from 400% to 350% and then to 240%. In embodiment variants, there can also be two or more pairs of motorized rollers, in order to execute via successive steps the reduction of the percentage elastic elongation of the elastic threads 8 up to the desired value.

In embodiment variants, instead of producing the composite elastic web 11 in a production line by means of the coupling device 9, the composite elastic web 11 is previously produced in a different place and/or with a different apparatus/device and then wound in a reel on a reel holder. With reference to FIG. 1, in place of the coupling device 9, a reel holder is present with the composite elastic web 11 wound in a reel and the first pair of motorized rollers 12 is therefore situated just downstream of the reel holder. The composite elastic web 11 is wound in a reel with its own elastic threads 8 with a reduced elongation, nearly at rest. In such embodiment variants, the composite elastic web 11 is unwound from the reel by means of the first pair of motorized rollers 12 so as to stretch said web 11 and directly confer to said web 11 the application tension and the elongation lower than the nominal maximum elongation thereof and such to confer to the elastic threads 11 the second percentage elastic elongation 2.

According to embodiment variants, not illustrated in detail, the elastic threads 8 are distributed only on part of the width of the composite elastic web 11.

According to other embodiments, not illustrated in detail, in place of the elastic threads 8 interposed between the two webs of material 3a, 3b, the composite elastic web 11 comprises one or more elasticized layers of fabric or non-woven fabric.

ELEMENTS 1 plant
2 pull-up diapers
3a, 3b webs of material
4 reels
5 reel holder
6 leg-opening unit
7 spools
8 elastic threads
9 coupling device
10 pair of coupling rollers
11 elastic web
12 first pair of motorized rollers
13 second pair of motorized rollers
14 applicator
15 absorbing inserts
16 rotatable wheel
17 transport surface
18 conveyor
19 conveyor belt
20 application zone
21 dispenser of hot glue
22 openings for the legs
23 separation zones
24 auxiliary conveyor belt
25 folding device
26 joining device
27 cutting device
28 cutting lines
D advancing direction
Δ1% first percentage elastic elongation
Δ2% second percentage elastic elongation
T1 first tension
T2 second tension or application tension
V1 first linear speed
V2 second linear speed

The invention claimed is:

1. Method for applying absorbing inserts in a process for the production of pull-up diapers, comprising:
producing a composite elastic web comprising at least one web of material and at least one elastic element longitudinally coupled to said at least one web of material; wherein the composite elastic web has a nominal maximum elongation corresponding to a nominal width of the pull-up diapers to be manufactured; wherein, when the composite elastic web is at its nominal maximum elongation, said at least one web of material is fully extended and said at least one elastic element has a first percentage elastic elongation;

feeding the composite elastic web along a path and according to an advancing direction, conferring to said elastic composite web an application tension such that the composite elastic web has an elongation lower than its nominal maximum elongation and said at least one elastic element has a second percentage elastic elongation lower than the first percentage elastic elongation;

applying absorbing inserts on an intermediate portion of the composite elastic web when said composite elastic web advances with said application tension, so that, once the tension is completely released, the absorbing inserts remain substantially flat and do not form substantial folds or wrinkles.

2. The method of claim 1, wherein the first elastic percentage elongation corresponds to a maximum elastic elongation of the elastic element.

3. The method of claim 1, wherein a ratio of the second percentage elastic elongation to the first percentage elastic elongation is greater than 0.3, and lower than 0.99.

4. The method of claim 1, wherein the first percentage elastic elongation is between 200% and 600%.

5. The method of claim 1, wherein the second percentage elastic elongation is between 100% and 300%.

6. The method of claim 1, wherein the composite elastic web comprises a first web of material, a second web of material and a plurality of elastic threads arranged longitudinally between the first web of material and the second web of material; wherein said at least one element of said composite elastic web comprises or is defined by the plurality of elastic threads.

7. The method of claim 6, wherein making the composite elastic web comprises: feeding the first web of material and the second web of material along respective paths; feeding the plurality of elastic threads along a respective path; inserting the plurality of elastic threads between the first web of material and the second web of material and joining the plurality of elastic threads to the first web of material and the second web of material while the first web of material, the second web of material and the plurality of elastic threads advance along a common path, to form the composite elastic web; wherein, during the joining, the elastic threads are given the first percentage elastic elongation and the first web of material and the second web of material are fully extended.

8. Process for the production of pull-up diapers, comprising the method of claim 1 and further comprising, while the composite elastic web advances along said path and according to the advancing direction:

cutting out in the composite elastic web, between successive absorbing inserts, openings for the legs, to define a series of precursors of pull-up diapers, wherein the intermediate portion of the composite elastic web corresponds to the crotch of the pull-up diapers, each provided with the absorbing insert, and two opposite longitudinal lateral portions of the composite elastic web correspond to the waist of the pull-up diapers and wherein transverse separation zones separate one precursor from the next;

longitudinally folding the composite elastic web so that opposite sides of each transverse separation zone are brought next to each other and joining together said opposite sides;

cutting the composite elastic web at the transverse separation zones to obtain the individual pull-up diapers.

9. The process of claim 8, wherein, downstream of the application of the absorbing inserts and up to before the cut in the individual pull-up diapers, the composite elastic web is maintained at the application tension.

10. Device for applying absorbing inserts through the method of claim 1 in a plant for the production of pull-up diapers, the device comprising:

at least one motorized surface, configured to engage and advance the composite elastic web along the path and according to the advancing direction;

an applicator operating downstream of said at least one motorized surface and configured to apply in succession on the composite elastic web the absorbing inserts while the composite elastic web advances along the path and according to the advancing direction;

a control unit operatively connected to said at least one motorized surface and configured and/or programmed to adjust a linear speed of said at least one motorized surface in order to:

confer to the composite elastic web the application tension when the composite elastic web is downstream of said at least one motorized surface and at the applicator.

11. The device of claim 10, wherein the control unit is configured and/or programmed to give the motorized surface an application linear speed and to advance the composite elastic web according to the application linear speed in an application zone of the applicator and while the applicator applies the absorbing inserts to the elastic web.

12. The device of claim 10, wherein the applicator comprises a transport surface configured to hold the absorbing inserts and transport them one after the other in an application zone; wherein, in said application zone, the transport surface is facing and close to the composite elastic web so as to lay the absorbing insert against the composite elastic web and release the absorbing insert onto the composite elastic web; optionally wherein the control unit is operatively connected to the applicator and is configured and/or programmed to adjust a linear speed of the transport surface; optionally wherein said linear speed of the transport surface is, at least in the application zone, substantially equal to the application linear speed of the composite elastic web.

13. The device of claim 10, comprising: devices for feeding a first web of material and a second web of material along respective paths; devices for feeding a plurality of elastic threads along a respective path; a coupling device configured to insert the plurality of elastic threads between the first web of material and the second web of material and to join the plurality of elastic threads to the first web of material and to the second web of material; wherein the control unit is operatively connected to the feeding devices of the first web of material and of the second web of material, to the devices for feeding the plurality of elastic threads and to the coupling device and is configured and/or programmed to adjust feeding speeds of the first web of material, of the second web of material and of the plurality of elastic threads conferring the elastic threads the first elastic percentage elongation while the first web of material and the second web of material are fully extended.

14. The device of claim 10, comprising: a reel holder configured to carry, in a reel, the composite elastic web; said at least one motorized surface being placed downstream of the reel holder to engage and advance the composite elastic web unwound from the reel holder.

15. Plant for the production of pull-up diapers, comprising the device of claim 10 and further comprising:

a leg-opening unit placed downstream of the applicator and configured to cut out in the elastic web, between successive absorbing inserts, leg openings and to define a series of precursors of pull-up diapers, wherein transverse separation zones separate one precursor from the next;

a folding device placed downstream of the leg-opening unit and configured to fold the elastic web longitudinally and to bring opposite sides of each transverse separation zone next to each other;

a joining device placed downstream of the folding device and configured to join together said opposite sides;

a cutting device placed downstream of the joining device and configured to cut the elastic web at the transverse separation zones and obtain the individual pull-up diapers.

\* \* \* \* \*